April 21, 1970     G. E. GARD ET AL     3,507,946

BLENDING METHOD AND APPARATUS

Filed Nov. 12, 1968     2 Sheets-Sheet 1

INVENTORS
GEORGE E. GARD
WILLIAM K. BOAK

BY

ATTORNEY

INVENTORS
GEORGE E. GARD
WILLIAM K. BOAK

United States Patent Office 3,507,946
Patented Apr. 21, 1970

3,507,946
BLENDING METHOD AND APPARATUS
George E. Gard, Lancaster, and William K. Boak, Columbia, Pa., assignors to Armstrong Cork Company, Lancaster, Pa., a corporation of Pennsylvania
Filed Nov. 12, 1968, Ser. No. 774,614
Int. Cl. H01q 15/08
U.S. Cl. 264—122    6 Claims

ABSTRACT OF THE DISCLOSURE

A shaped form is placed within a cylindrical mold and slowly moved along the mold axis. Different dividers are placed within the form in sequence as it is moved, and dielectric materials are dispensed into the mold adjacent said shaped form and dividers to produce differently shaped bodies of dielectric material at different axial levels in the mold. The resultant three-dimensionally shaped charge of dielectric material is then stirred, randomized, and fused into a monolithic mass.

CROSS-REFERENCE TO RELATED APPLICATION

The present invention comprises an improvement on the invention described in Gard copending U.S. application Ser. No. 623,020 filed Mar. 14, 1967, for "Shaped Charge Blending Method and Product."

BACKGROUND OF THE INVENTION

The present invention relates to a novel method and apparatus for blending natural or artificial dielectric materials, having different dielectric constants, to produce a composite mixture exhibiting a dielectric gradient in desired directions. Such a composite mixture can be used to fabricate dielectric microwave lenses wherein the dielectric constant, and hence the refractive index of the lens, varies as a function of the lens coordinates. It may also be used in other fabrication applications wherein it is desired to variably mix two or more materials to produce different relative percentages of the materials at different places throughout a larger body, thereby to achieve any desired gradient or pattern in electrical, physical, or visual characteristics in either two or three dimensions.

As discussed in application Ser. No. 623,020, identified above, various techniques have been utilized in the past for mixing two or more dielectric materials. Some of these prior techniques utilize a pair of conveyors for transporting different materials toward a common mixing location, one of said materials comprising, for example, plain polystyrene beads, and the other materials comprising aluminum-sliver loaded polystyrene beads. The amount of these two materials transported along their respective conveyors is controlled by gates, so as to produce a composite mixture having a desired dielectric gradation.

The use of conveyor and gating techniques imposes limitations on the size of the mass which can be produced, and, for various reasons, also introduces the possibility of gradient errors. These difficulties have been obviated to a large extent by the improved blending technique described in said application Ser. No. 623,020, the subject matter of which is incorporated herein by reference.

Application Ser. No. 623,020 teaches a shaped charge blending method wherein a composite charge, of two or more different dielectric materials, is directly formed in a cylindrical mold. The materials may be particulate, or they may take other physical configurations, e.g. viscous liquids, or combinations thereof. The composite charge includes a charge of first material which is placed in the mold in a predetermined two-dimensional or three-dimensional shape, with this first charge being supported by a further charge of a second material, having a different dielectric constant, placed adjacent thereto. In a particular embodiment of the invention, wherein it is desired to achieve a Luneberg gradation, the composite charge is fabricated to produce a relatively high index charge having a cross-section of heart or cardioid shape (or its equivalent) supported within the mold by means of an adjacent mass of lower index dielectric material. The heart shaped charge has two distinct lobes which meet at the axial center of the cylindrical mold, and the composite shaped charge is stirred on circles about the said axial center so as to blend the two materials in varying concentrations dependent upon the relative quantities of the two materials which lie along each stirring circle. When the materials are particulate, the particles in the resultant blend are then randomized by moving a relatively fine mesh isotropy screen through the blended materials, whereafter the resultant mass of material is fused.

The shaped charge blending method described, while achieving a number of advantages over conveyor and gating techniques, requires that much care be taken to achieve proper shaping of the charges. In one procedure described in application Ser. No. 623,020, a three-dimensionally shaped supporting form is employed, into which high index material is placed; and differnt sections of the form are then removed in sequence (leaving portions of the high index charge temporarily unsupported) and replaced by charges of lower index material. This procedure, whether used to achieve shaped charges in two or three dimensions, relies on the properties of the blend materials to hold their shaped configuration during a period of time when they are otherwise unsupported by an adjacent mold or form structure or by an adjacent mass of blend material.

The requirement that the blend materials hold a charge shape, even though unsupported, imposes limitations on the charge materials which can be employed and requires extreme care to avoid disturbing the charge shapes. In order to avoid manipulative steps which leave portions of the charge unsupported, an alternative procedure was developed using a special form adapted to be inserted into the charge receiving container and extending between the bottom and top of that container. The special form comprises a plurality of differently dimensioned dividers extending at differnt angles to one another at different axial levels in the charge receiving container. By using this special form, a three-dimensionally shaped charge has been achieved comprising a plurality of differently shaped charges superposed on one another within a mold.

The use of the special form described above assures that the shaped charge at each axial level in the mold is always physically supported by an adjacent structure, or by an adjacent mass of blend material, during the charge formation steps. However, once the three-dimensionally shaped charge is completed, the form itself must be pulled out of the mold to permit the charge to be stirred, randomized, and fused. This need to physically pull the form out of the mold has been found to disturb the relative shapes of the charge constituents at different levels along the line that the form is pulled, principally at the center of the composite charge; and the pulling step accordingly tends to produce certain gradient errors in the lens. While the final lens efficiency is still far better than was the case with prior processes, the gradient errors produced during fabrication prevent achievement of optimum results.

The present invention, by utilizing still further improvements in the apparatus and procedures employed, achieves shaped charges in either two or three dimensions without having to rely on the properties of the blend materials to hold their shaped configuration while unsupported, and without introducing possible gradient errors due to manipulation of the charge supporting structures.

SUMMARY OF THE INVENTION

In accordance with the present invention, continuously graded radial patterns in material properties within cylindrical or spherical volumes may be achieved by the fabrication of composite shaped charges in an apparatus wherein successive manipulative elements are nested in a mold before any charge material is added to that mold. The charge material may take various forms, including particulate materials, viscous liquids, and combinations thereof; and it must therefore be understood that the present invention is not limited to use with any particular physical type of dielectric material, so long as the material selected can be shaped and thereafter stirred in the manner to be described.

In a preferred embodiment of the invention, the nested elements comprise an outer mold structure; a first sleeve nested within said mold structure and having a relatively fine mesh isotropy screen across its bottom; a second sleeve nested within said first sleeve and having a coarser mesh mixing screen across its bottom; and a shaped form nested within the second sleeve. Shaped charges are fabricated within the mold by appropriate manipulation of the innermost element, the shaped form, whereafter the form is completely removed from the assembly. The second sleeve (mixing screen) is then rotated, and simultaneously withdrawn, to achieve desired stirring of the shaped charges, whereafter the first sleeve (isotropy screen) is withdrawn through the stirred charge. The stirred and randomized charge left in the outermost element of the assembly, i.e., in the mold itself, is then fused into a monolithic mass (or lens). By using this nested arrangement of successive manipulative elements, the desired blend is efficiently produced; and, at the same time, pattern disturbances are eliminated which might otherwise result from the introduction of manipulative elements into the charge after charge layup.

A further improvement is achieved by utilizing a form (the innermost element of the assembly) whose overall height is only a fraction of the height of the mold itself. This relatively short form is initially disposed at the bottom of the mold, and is then moved in a series of steps to the top of the mold. The form is associated with a plurality of dividers capable of being readily inserted into and removed from the form at each step as the form progresses between the bottom and top of the mold. By use of these elements, differently shaped charges are readily fabricated at a plurality of different axial levels between the bottom and top of the mold as the form is withdrawn from the mold; and each shaped charge, at each level, has its boundary surfaces fully supported during the charge formation steps. The formation of a particular shaped charge at a given axial level in no way disturbs the charge at an underlying level; and once a shaped charge is formed at a given level, the form can than be moved to a next successive level without disturbing the charge shape at said given level.

The overall arrangement thus assures very accurately shaped charge formations since the boundary walls of each shaped charge are fully supported at the time of charge formation and thereafter, and further assures that the shaped charges so formed are not disturbed prior to the stirring and randomizing steps.

DESCRIPTION OF THE PREFERRED EMBODIMENTS

Figure 1:
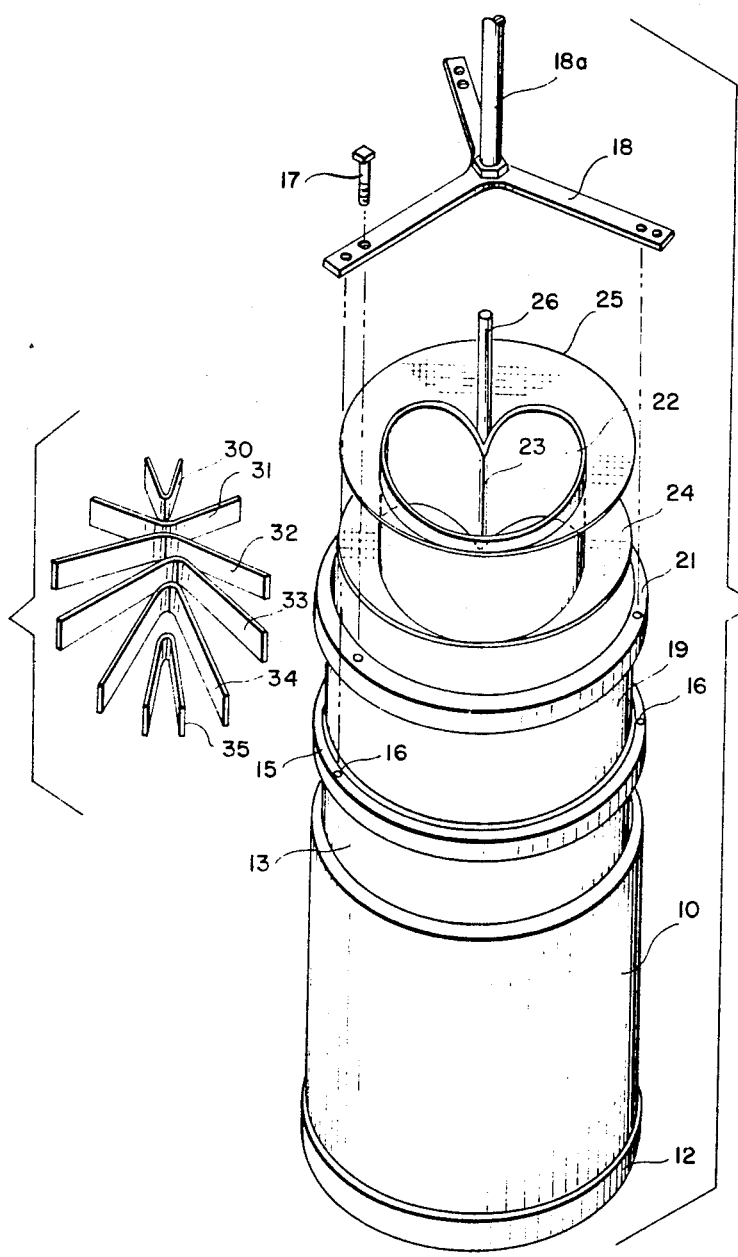
FIGURE 1 is an exploded perspective representation of the apparatus employed in the present invention.
Figure 2:
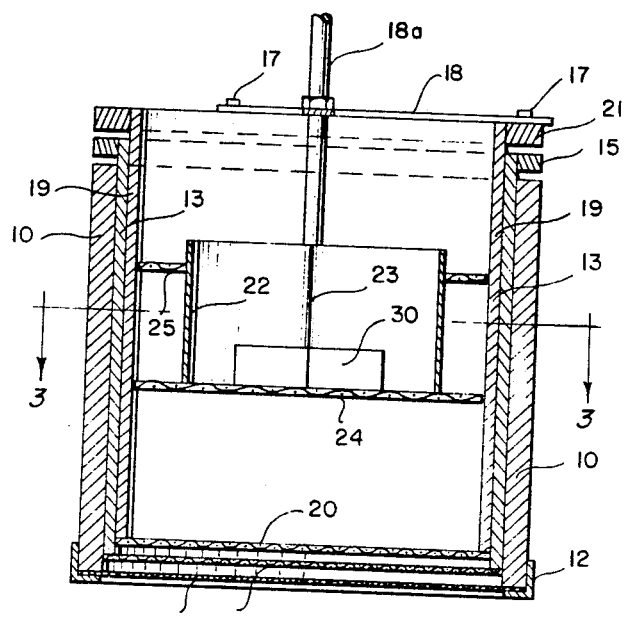
FIGURE 2 is a side cross-sectional view of the apparatus shown in FIGURE 1, illustrating the manner in which the apparatus may be employed to practice the method of the present invention.

In order to achieve the various advantages already described, the present invention contemplates use of a nested arrangement of successive manipulative elements. The elements employed are best shown in FIGURES 1 and 2 and comprise an outermost cylindrical container 10 which acts as a mold in which the final charge may ultimately be fused into a monolithic mass. The bottom of mold 10 is covered by an apertured closure comprising a composite layer of expanded metal and fine mesh screening designated 11 in FIGURE 2, and held in place by means of an annular flange 12. When the dielectric materials to be employed are particulate in nature, the size of the apertures provided in closure 11 is selected in relation to the size of the particulate dielectric material which is to be deposited in mold 10, to assure that the material is retained in the mold while at the same time assuring that steam may be effectively applied to such particulate materials for fusion purposes.

A first cylindrical sleeve 13 is nested within mold 10 in sliding engagement therewith. The bottom of sleeve 13 is covered by a relatively fine mesh screen 14 having a mesh size slightly larger than that of the particulate materials deposited in mold 10; and screen 14 acts as an isotropy screen for ultimate use in randomizing the particulate materials. The uppermost edge of sleeve 13 is provided with a flange 15 having apertures 16 therein arranged to receive bolts 17 so that an appropriate support 18 may be removably affixed to sleeve 13 for manipulative purposes (to be described).

A further cylindrical sleeve 19 is nested within sleeve 13 in sliding engagement therewith. Sleeve 19 is provided with a further mesh screen 20, extending across its bottom end, and constituting a stirring screen, having a mesh size larger than that of isotropy screen 14. Sleeve 19 is also provided at its upper end with a flange 21 to which support 18 may be removably attached for manipulative purposes.

The innermost element of the nested assembly comprises a shaped form 22 fabricated of sheet metal. Form 22 is hollow at its top and bottom, and has side walls which extend generally parallel to the axis of the nested cylindrical elements 10, 13, and 19. The cross section of form 22 is of heart or cardioid configuration although as discussed in prior application Ser. No. 623,020, other shapes may be employed. The cardioid shape illustrated in the drawings produces a Luneberg gradation when the composite charge of that cross-sectional configuration is ultimately stirred in circles about a center located at the junction 23 between the two lobes of the heart shape.

Figure 3:
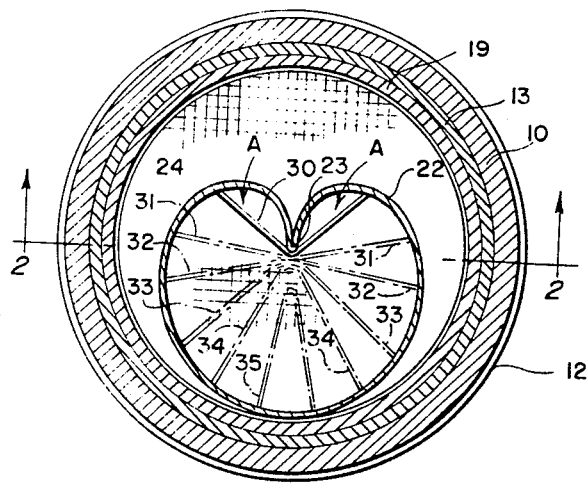
FIGURE 3 is a cross-sectional view taken on line 3—3 of FIGURE 2.

Form 22 is properly positioned, and maintained in axial position relative to elements 10, 13 and 19, by means of support screen members 24 and 25 attached to form 22. Each screen has a relatively large mesh size adapted to provide adequate mechanical strength for support purposes without impeding ready entry of particulate dielectric materials into, through, and around the sides of form 22. As is best shown in FIGURES 1 and 3, each screen 24 and 25 has a circular periphery dimensioned to permit the assembly of screens 24, 25 and form 22 to be slidably moved within sleeve 19; and an elongated shaft 26 is attached to form 22 to facilitate such slidable movement of the form. Form 22, as best shown in FIGURE 3, is so positioned by screens 24 and 25 that junction 23 of the form is coincidence with the main axis of the assembled cylindrical elements 10, 13 and 19.

The elements thus far described can, by themselves, be employed to form a dielectric charge which exhibits a radial Luneberg gradation in two dimensions. However, when it is desired to employ these elements to fabricate a spherical or semi-spherical Luneberg lens having a radial gradation in three dimensions, the elements are further associated with a plurality of dividers which have been designated 30–35 inclusive. These dividers are adapted to be placed into form 22 in sequence, with each divider, when properly placed in the form, assuming the relative position best shown in FIGURE 3.

Each divider 30–35 comprises a pair of straight-sided strips intersecting one another at a common junction. The dividers are differently dimensioned and subtend different angles between the sides thereof so that when a divider is positioned within form 22 with the free ends of the divider in engagement with spaced interior portions of form 22, differently dimensioned and shaped portions of form 22 are segregated for the reception of dielectric materials. By use of these dividers in the manner now to be described, a three-dimensionally shaped charge capable of use in fabricating a spherical or semi-spherical Luneberg lens can readily be achieved.

In order to understand the way in which the various elements thus far described are manipulated, let us assume that it is desired to produce a spherical lens having a substantially uniform Luneberg gradation in all radial directions. The several elements 10, 13, and 19 are first assembled in nested relation in accordance with FIGURES 1 and 2. A layer of relatively low index dielectric material, e.g., plain expanded polystyrene beads having an index near 1.0, is then poured into the bottom of sleeve 19. Form 22 is then inserted in place and is moved toward the bottom of the nested assembly, onto the initial low index layer.

Divider 30 is then inserted into form 22 so as to assume the position shown in FIGURE 3. As will be noted from FIGURE 2, the height of divider 30 is only a fraction of that of the side walls of form 22 so that, at this time, divider 30 lies near the bottom of form 22 and near the bottom of the overall nested arrangement. Relatively high index particulate dielectric material is then dispensed into the upper region between form 22 and divider 30 (as viewed in FIGURE 3). This particular region has been designated A in FIGURE 3. The relatively high index material employed can be an artificial dielectric material comprising a blend of aluminum-silver loaded polystyrene beads, exhibiting a refractive index of 1.4. Lower index dielectric material, e.g., the plain expanded polystyrene beads mentioned earlier, is then dispensed into the remainder of form 22 below divider 30 (as viewed in FIGURE 3), and, via screens 25 and 24, into the exterior region surrounding form 22 and bounded by the interior of sleeve 19. When this dispensing operation has been completed, a shaped charge of relatively high index material, having the shape of region A and surrounded by lower index particulate material, will have been produced near the bottom of the nested assembly.

By use of shaft 26, form 22 and its associated supporting screens 24 and 25 is then moved upwardly by an amount corresponding to the height of divider 30. This pulls divider 30 out of the charge previously formed, leaving the high index material supported by a surrounding mass of lower index material; and, at the same time, frees divider 30 from the previously formed shaped charge. Divider 30 is then removed and replaced by the next divider 31. High index material is then again dispensed into the region between form 22 and the upper wall of divider 31 (as viewed in FIGURE 3). Lower index material is dispensed into the remainder of form 22, and into the region surrounding form 22, whereby a further shaped charge is produced above the previously formed shaped charge, but having a new shape dictated by the dimensions of divider 31. Form 22 is then elevated by a further amount corresponding to the height of divider 31, whereafter divider 31 is removed and replaced by divider 32. In similar manner, further high and low index material is then dispersed into the segregated regions provided by divider 32 and form 22 etc.

The steps outlined above are continued in sequence starting with form 30 and progressing through forms 31–35 inclusive. After divider 35 has been used to form the necessary shaped charge at its corresponding level, form 22 is pulled up one further step, divider 35 is removed and high index material is dispensed into the entire cross section of form 22 to provide a central layer of high index material having a complete cardioid cross section, surrounded by lower index material outside of form 22. Form 22 is then pulled up another step, divider 35 reinserted, and a further shaped charge produced using divider 35. The sequence of steps outlined then continues using forms 34, 33, 32, 31 and 30 in succession. When the divider 30 shaped charge (corresponding to region A) is finally formed near the top of sleeve 19, form 22 will be disposed near the top of the overall nested assembly and can then be removed entirely. A final layer of low index material only is then dispensed into sleeve 19.

By the sequence of steps described, a spherical lens within a cylindrical volume is charged by limiting the high index blend to the area defined between the form and the successive dividers at a succession of different elevations within sleeve 19. It will be appreciated that, since six forms 30–35 are employed, and since a central layer in the composite charge uses form 22 alone, the charge will comprise a total of 13 superposed levels, each of which has a differently shaped charge of high index material supported by a surrounding mass of lower index material. If the height of each step or level is roughly one inch, an appropriate composite charge for use in fabricating a 12-inch diameter spherical lens will be achieved, with the tip of each divider defining the peripheral boundary of the sphere at the corresponding elevation of that divider.

It must be understood, of course, that more than the six dividers 30–35 can be employed. The use of six dividers has been found useful in fabricating lenses of six inches to 12 inches in diameter. If it is desired to fabricate a spherical lens having a diameter of, for example, 18 inches to 24 inches, it is preferable to employ 12 dividers, making a total of 25 steps in the composite charge. For even larger lenses, e.g., 44-inch diameter lenses, it is preferable to employ 22 dividers, making a total of 45 steps in all. Moreover, the height of the several dividers need not be the same. For example, the dividers employed near the opposing poles of the sphere (e.g., dividers such as 30) can be of lesser height than the other dividers to better approximate the gradation in this polar region. The optium step height or height selected for the several dividers is related to the frequency at which the lens is to be used, and to the blend material employed.

Once the composite shaped charge has been built up in the manner described, and form 22 completely removed, support 18 is bolted to flange 21 of sleeve 19. Shaft 18a of support 18 is then attached to an appropriate driving mechanism arranged to rotate sleeve 19 slowly, and simultaneously to elevate it slowly. This causes stirring screen 20 to blend the composite charge in circles about the central axis of the charge. Possible speeds of rotation and elevation have been discussed in prior application Ser. No. 623,020 and will not be repeated here. The driving mechanism employed to rotate and elevate stirring screen 20 should preferably be so arranged that the screen 20 is also caused to exhibit a vibratory motion so as to facilitate stirring of the particulate dielectric materials.

After the stirring step has been completed, sleeve 19 will have been pulled completely out of the nested assembly of parts. Support 18 is then detached from sleeve 19 and fastened to flange 15 of sleeve 13. Shaft 18a of support 18 is then coupled to a further driving mechanism adapted to slowly pull sleeve 13 out of the assembly, to draw isotropy screen 14 through the stirred mass of particulate material. Again, the driving mechanism employed at this stage of the procedure should preferably be arranged to vibrate isotropy screen 14 to facilitate its passage through the stirred blend without disturbing the relative proportions of the mix.

After the foregoing steps have been completed, a stirred and randomized mass of particulate dielectric material having a three-dimensional radial dielectric gradient, remains within the outermost element of the assembly, i.e., within mold 10. This mass of material can then be fused into a monolith by an appropriate steam fusion procedure.

After fusion, the mass within mold 10 comprises a spherically graded lens encased within a cylindrical body. A monolith of this type, after removal from mold 10, can if desired be machined into a lens having a spherical exterior. More particularly, the position of the electrical equator of the spherical lens can be determined electrically by application of microwave energy to the cylindrical mass, and the spherical lens itself can then be turned out of its cylindrical low-index matrix by using the established electrical equator of the sphere as a reference line.

The entire procedure described above contemplates, of course, the fabrication of a three-dimensional dielectric lens. If it is desired to merely form a two-dimensional lens, the parts can still be used in the manner described but without use of the dividers 30–35. More particularly, the shaped hollow form 22 would then be employed alone, and this form 22 would be continuously filled with relatively high index material, and surrounded by relatively low index material, as the form is slowly pulled up out of the nested components 10, 13, and 19.

The various advantages achieved by use of the apparatus and method described above have already been discussed in earlier sections of this specification. A further advantage arises out of use of straight-sided dividers 30–35 since the fabrication of shaped charges having straight-sided boundaries lowers the cost of making the necessary dividers, simplifies the successive pulling operation described, and minimizes disturbances in the charge. It must be understood, however, that other shapes of dividers, as well as other shapes of the master form 22, can be employed without departing from the principles of the present invention.

Having thus described our invention, we claim:

1. The method of forming a dielectric mass of material comprising the steps of placing a hollow, cardioid-shaped form within a cylindrical container, said form having an open top and bottom, having side walls extending generally parallel to the axis of said container, and having the junction of the lobes of said cardioid shape extending generally along the axis of said container, moving said form along the axis of said cylindrical container, dispensing a first dielectric material into the region between the outer surface of said form and the interior surface of said container as said form is moved to different axial positions within said container, also dispensing a second dielectric material, having a dielectric constant different from said first material, into at least a portion of the cardioid-shaped region enclosed by the side walls of said form as said form is moved to different axial positions within said cointainer, dispensing said first dielectric material into any remaining portion of said cardioid shaped region not filled by said second dielectric material as said form is moved to said different axial positions and thereafter stirring the dielectric materials in said container in planes extending transverse to the axis of said container to blend said first and second dielectric materials.

2. The method of claim 1 wherein said form is moved to different positions with said container in increments, said method including the steps of successively placing different dividers into said form in sequence at the various incremental positions of said form as said form is moved to different axial positions within said container, said second dielectric material being dispensed in a succession of increments into the successive differently shaped regions defined between the interior side walls of said form and one side of each of said successively different dividers.

3. The method of claim 2 including the step of also incrementally dispensing said first dielectric material into the region between the side walls of said form and the other side of each of said dividers as said form is moved to said different axial positions within said container.

4. The method of forming a dielectric mass of material which comprises the steps of placing a hollow form into a container, said form having side walls extending generally parallel to a predetermined line of movement, moving said form in increments between the bottom and top of said container along said predetermined line of movement, sequentially placing different ones of a plurality of differently dimensioned dividers into the interior of said form at the different incremental positions of said form to form a succession of differently shaped regions bonded respectively by said form and the opposite sides of different ones of said dividers, incrementally dispensing different dielectric materials into said differently shaped regions on opposite sides respectively of each of said dividers at the different incremental positions of said form, removing said form and dividers from said container, and then blending said different dielectric materials together in parallel layers disposed transverse to said predetermined line of movement.

5. The method of claim 4 wherein said form is of cardioid cross section, each of said dividers having a pair of intersecting straight sides angularly disposed to one another to provide a pair of free ends spaced from a common junction, each of said dividers being placed in said form with its free ends in engagement with spaced interior portions of the side walls of said form.

6. The method of forming a unitary mass having a dielectric constant gradient therein comprising the steps of placing a shaped form into a cylindrical mold, slowly moving said form along the mold axis, placing different dividers into the form in sequence at different axial positions of said form, incrementally dispensing dielectric materials having differing dielectric constants into the mold adjacent said shaped form and dividers at said different axial positions to produce superposed, differently shaped, incremental masses of said different dielectric constant materials at different axial levels in the mold, blending together said different dielectric constant materials in layers transverse to said mold axis, and thereafter fusing said blended materials into a monolithic mass in said, mold.

References Cited

UNITED STATES PATENTS

| | | | |
|---|---|---|---|
| 2,260,298 | 10/1941 | Cowling | 107—54.4 |
| 2,344,901 | 3/1944 | Routh | 107—54.4 |
| 2,801,444 | 8/1957 | Lorenian | 18—30 |

DONALD J. ARNOLD, Primary Examiner

A. H. KOECKERT, Assistant Examiner

U.S. Cl. X.R.

18—30; 259—4, 114, 180; 264—45, 46, 73; 343—911